United States Patent
Smith et al.

(10) Patent No.: US 10,927,682 B2
(45) Date of Patent: Feb. 23, 2021

(54) ENGINE COMPONENT WITH NON-DIFFUSING SECTION

(71) Applicant: GENERAL ELECTRIC COMPANY, Schenectady, NY (US)

(72) Inventors: Aaron Ezekiel Smith, Hermosa Lake, CA (US); Fernando Reiter, Reading, OH (US); Zachary Daniel Webster, Mason, OH (US)

(73) Assignee: General Electric Company, Schenectady, NY (US)

( * ) Notice: Subject to any disclaimer, the term of this patent is extended or adjusted under 35 U.S.C. 154(b) by 161 days.

(21) Appl. No.: 15/814,996

(22) Filed: Nov. 16, 2017

(65) Prior Publication Data

US 2019/0145267 A1 May 16, 2019

(51) Int. Cl.
  *F01D 5/18* (2006.01)
  *F02C 7/141* (2006.01)
  *F01D 5/14* (2006.01)

(52) U.S. Cl.
  CPC .............. *F01D 5/187* (2013.01); *F01D 5/141* (2013.01); *F02C 7/141* (2013.01); *F05D 2220/32* (2013.01); *F05D 2240/307* (2013.01); *F05D 2250/232* (2013.01); *F05D 2250/324* (2013.01); *F05D 2260/201* (2013.01); *F05D 2260/202* (2013.01)

(58) Field of Classification Search
  CPC ... F01D 5/08; F01D 5/12; F01D 5/141; F01D 5/18; F01D 5/186; F01D 5/187; F01D 25/12; F01D 25/24; F01D 9/02; F05D 2260/201; F05D 2260/202
  See application file for complete search history.

(56) References Cited

U.S. PATENT DOCUMENTS

| | | | | |
|---|---|---|---|---|
| 3,542,486 A | * | 11/1970 | Adiutori | F01D 5/187 415/115 |
| 4,893,987 A | * | 1/1990 | Lee | F01D 5/187 416/92 |
| 6,086,328 A | | 7/2000 | Lee | |
| 6,092,982 A | * | 7/2000 | Ikeda | F01D 5/186 137/806 |
| 6,343,474 B1 | | 2/2002 | Beeck et al. | |
| 6,630,645 B2 | | 10/2003 | Richter et al. | |
| 7,246,992 B2 | | 7/2007 | Lee | |
| 8,057,181 B1 | * | 11/2011 | Liang | F01D 5/186 416/97 R |
| 8,066,485 B1 | | 11/2011 | Liang | |
| 8,533,949 B2 | | 9/2013 | Bunker | |
| 8,814,500 B1 | | 8/2014 | Liang | |
| 8,851,848 B1 | | 10/2014 | Liang | |
| 2016/0201507 A1 | * | 7/2016 | Bunker | F01D 5/186 415/116 |
| 2017/0356294 A1 | * | 12/2017 | Torkaman | F01D 5/186 |

\* cited by examiner

*Primary Examiner* — Igor Kershteyn
*Assistant Examiner* — Elton K Wong
(74) *Attorney, Agent, or Firm* — McGarry Bair PC

(57) ABSTRACT

An apparatus and method for a component for a turbine engine, which generates a hot gas flow, and provides a cooling fluid flow, comprising a wall separating the hot gas flow from the cooling fluid flow and having a heated surface along which the hot gas flows and a cooled surface facing the cooling fluid flow and at least one cooling hole comprising a connecting passage extending between an inlet at the cooled surface and an outlet located at the heated surface, with the connecting passage comprising a diffusing section.

25 Claims, 6 Drawing Sheets

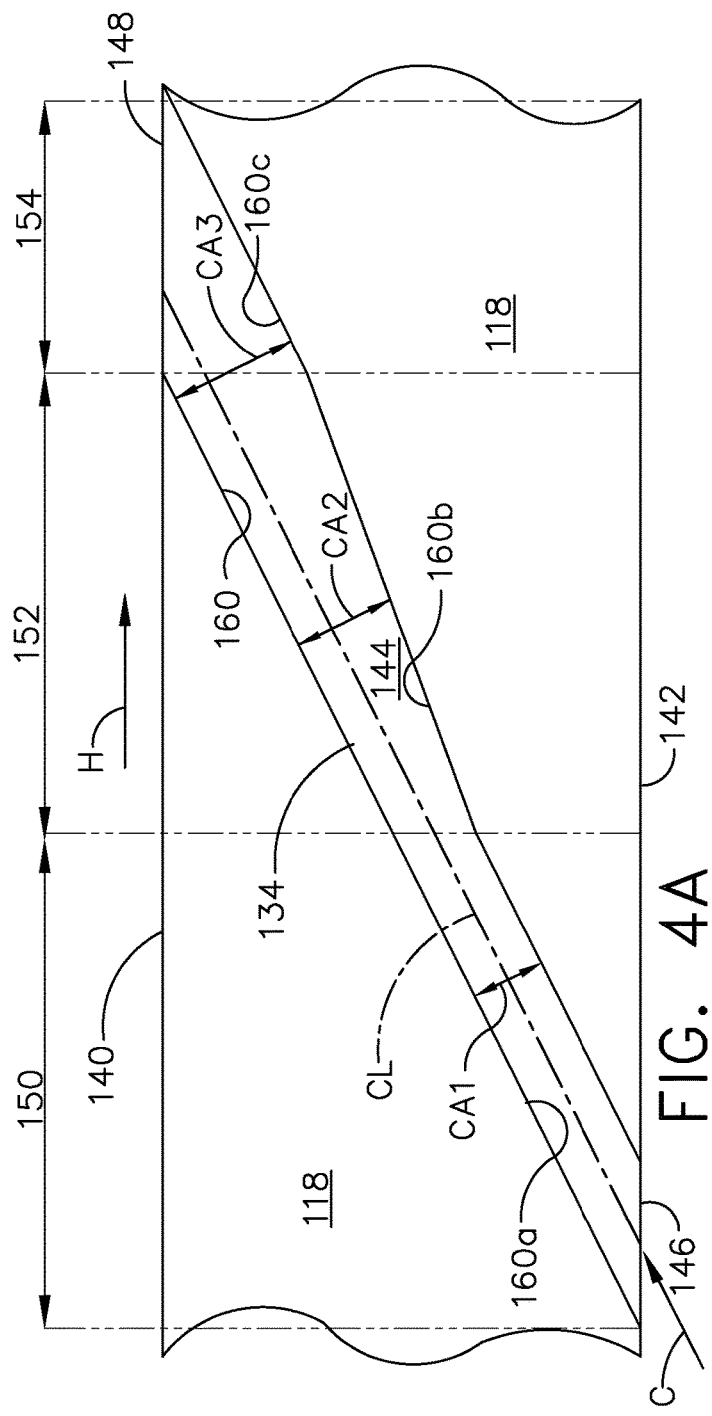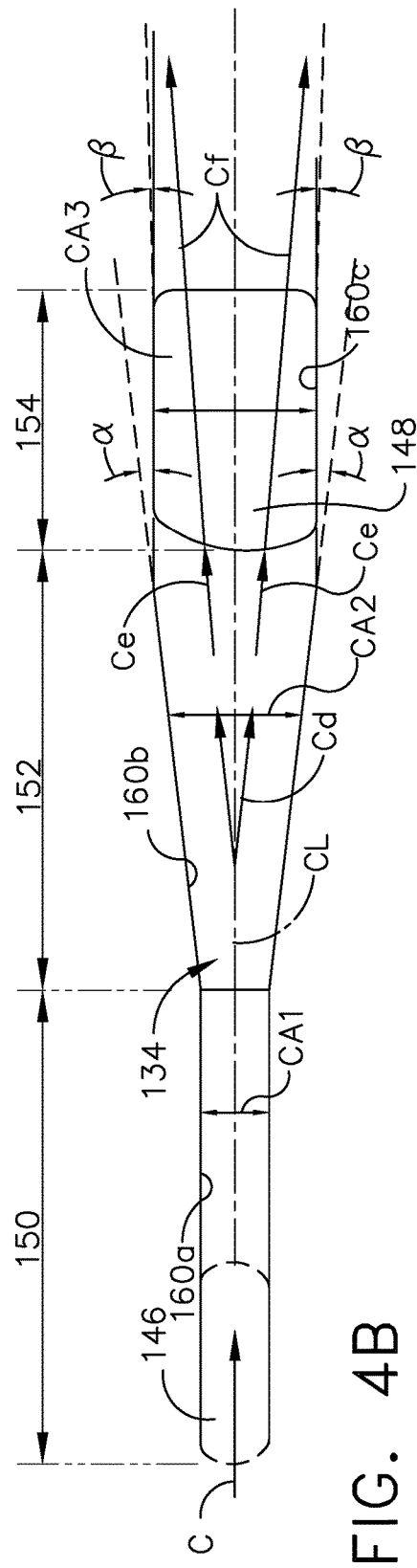
FIG. 4A
FIG. 4B

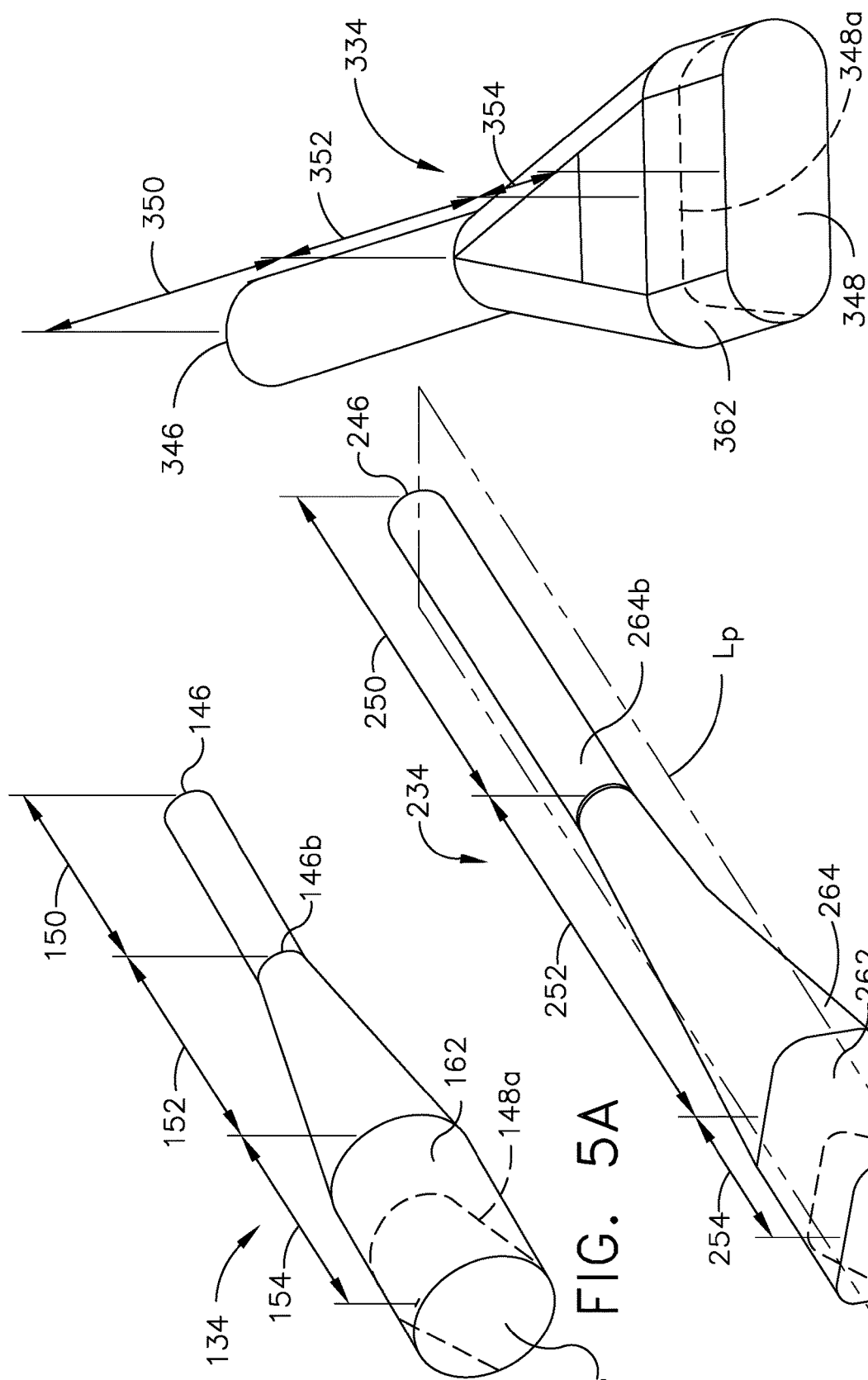

ENGINE COMPONENT WITH NON-DIFFUSING SECTION

BACKGROUND OF THE INVENTION

Turbine engines, and particularly gas or combustion turbine engines, are rotary engines that extract energy from a flow of combusted gases passing through the engine onto a multitude of rotating turbine blades.

Turbine blade assemblies include the turbine airfoil or blade, a platform and a dovetail mounting portion. The turbine blade assembly includes cooling inlet passages as part of serpentine circuits in the platform and blade used to cool the platform and blade. The serpentine circuits can extend to cooling holes located along any of the multiple surfaces of the blade including at the tip. Nozzles having inner and outer bands formed from stationary vanes and combustor liners surrounding the combustor of the engine can also utilize cooling holes and serpentine circuits.

BRIEF DESCRIPTION OF THE INVENTION

In one aspect, the present disclosure relates to a component for a turbine engine, which generates a hot gas flow, and provides a cooling fluid flow, comprising a wall separating the hot gas flow from the cooling fluid flow and having a heated surface along which the hot gas flows and a cooled surface facing the cooling fluid flow, and at least one cooling hole comprising a connecting passage extending between an inlet at the cooled surface and an outlet located at the heated surface, with the connecting passage comprising a diffusing section, and a non-diffusing section located between the diffusing section and the outlet.

In another aspect, the present disclosure relates to a component for a turbine engine, which generates a hot gas flow, and provides a cooling fluid flow, comprising a wall separating the hot gas flow from the cooling fluid flow and having a heated surface along which the hot gas flows and a cooled surface facing the cooling fluid flow, and at least one cooling hole comprising a connecting passage extending along a centerline between an inlet at the cooled surface and an outlet located at the heated surface, with the connecting passage comprising a diffusing section located between the inlet and the outlet and defining sidewalls forming a first side angle with respect to the centerline when viewed from a lateral plane, and a non-diffusing section located between the diffusing section and the outlet.

In yet another aspect, the present disclosure relates to a method of cooling an engine component with at least one cooling hole extending through a wall of the engine component between an inlet along a cooled surface facing a cooling fluid flow and an outlet along a heated surface along which hot gas flows the method comprising flowing the cooling fluid flow through a diffusion section of the at least one cooling hole and prior to emitting the cooling fluid flow from the outlet to form a diffused airflow, flowing the diffused airflow through a non-diffusing section prior to the outlet to define an extended flow, and exhausting the extended flow along an exterior of the wall to form a cooling fluid film.

BRIEF DESCRIPTION OF THE DRAWINGS

In the drawings:

FIG. 4A is a schematic side view of the at least one cooling hole from FIG. 2 according to an aspect of the disclosure discussed herein.

FIG. 4B is a schematic top view of the at least one cooling hole in FIG. 4A.

FIG. 5A is a 3D view of the at least one cooling hole from FIG. 2 according to an aspect of the disclosure discussed herein.

FIG. 5B is a 3D view of the at least one cooling hole from FIG. 2 according to another aspect of the disclosure discussed herein.

FIG. 5C is a 3D view of the at least one cooling hole from FIG. 2 according to yet another aspect of the disclosure discussed herein.

DETAILED DESCRIPTION OF THE INVENTION

Figure 1:
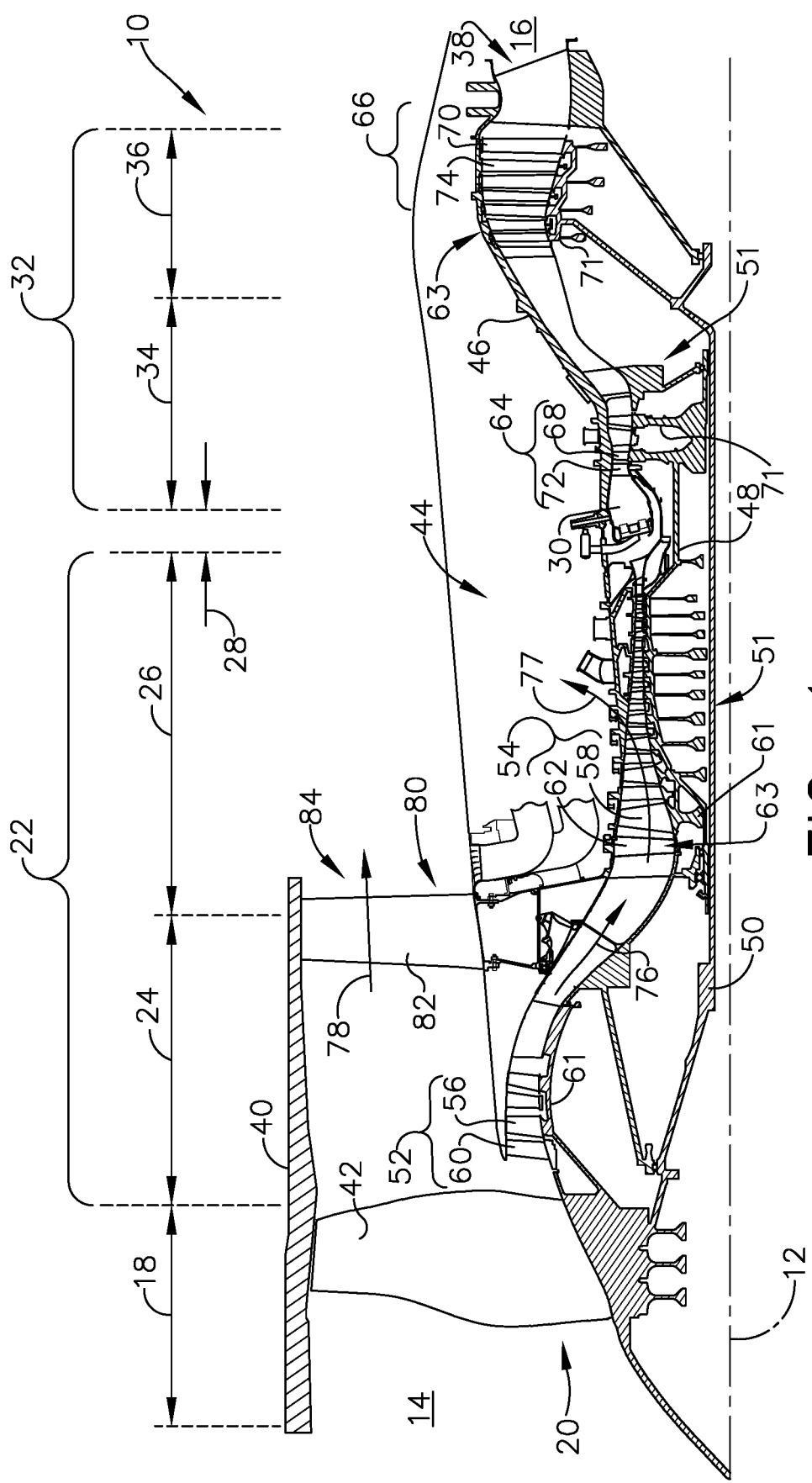
FIG. 1 is a schematic cross-sectional diagram of a turbine engine for an aircraft.

Aspects of the disclosure described herein are directed to the formation of at least one cooling hole having a connecting passage where the connecting passage includes a diffusing and non-diffusing section. For purposes of illustration, the present disclosure will be described with respect to the turbine for an aircraft gas turbine engine. It will be understood, however, that aspects of the disclosure described herein are not so limited and may have general applicability within an engine, including compressors, as well as in non-aircraft applications, such as other mobile applications and non-mobile industrial, commercial, and residential applications.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine or being relatively closer to the engine outlet as compared to another component. Additionally, as used herein, the terms "radial" or "radially" refer to a dimension extending between a center longitudinal axis of the engine and an outer engine circumference. Furthermore, as used herein, the term "set" or a "set" of elements can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The spools 48, 50 are rotatable about the engine centerline and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to a disk 61, which is mounted to the corresponding one of the HP and LP spools 48, 50, with each stage having its own disk 61. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50, with each stage having a dedicated disk 71. The vanes 72, 74 for a stage of the compressor can be mounted to the core casing 46 in a circumferential arrangement.

Complementary to the rotor portion, the stationary portions of the engine 10, such as the static vanes 60, 62, 72, 74 among the compressor and turbine section 22, 32 are also referred to individually or collectively as a stator 63. As such, the stator 63 can refer to the combination of non-rotating elements throughout the engine 10.

In operation, the airflow exiting the fan section 18 is split such that a portion of the airflow is channeled into the LP compressor 24, which then supplies pressurized air 76 to the HP compressor 26, which further pressurizes the air. The pressurized air 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components requiring cooling. The temperature of pressurized airflow 76 entering the combustor 30 is significantly increased. As such, cooling provided by the bleed air 77 is necessary for operating of such engine components in the heightened temperature environments.

A remaining portion of the airflow 78 bypasses the LP compressor 24 and engine core 44 and exits the engine assembly 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
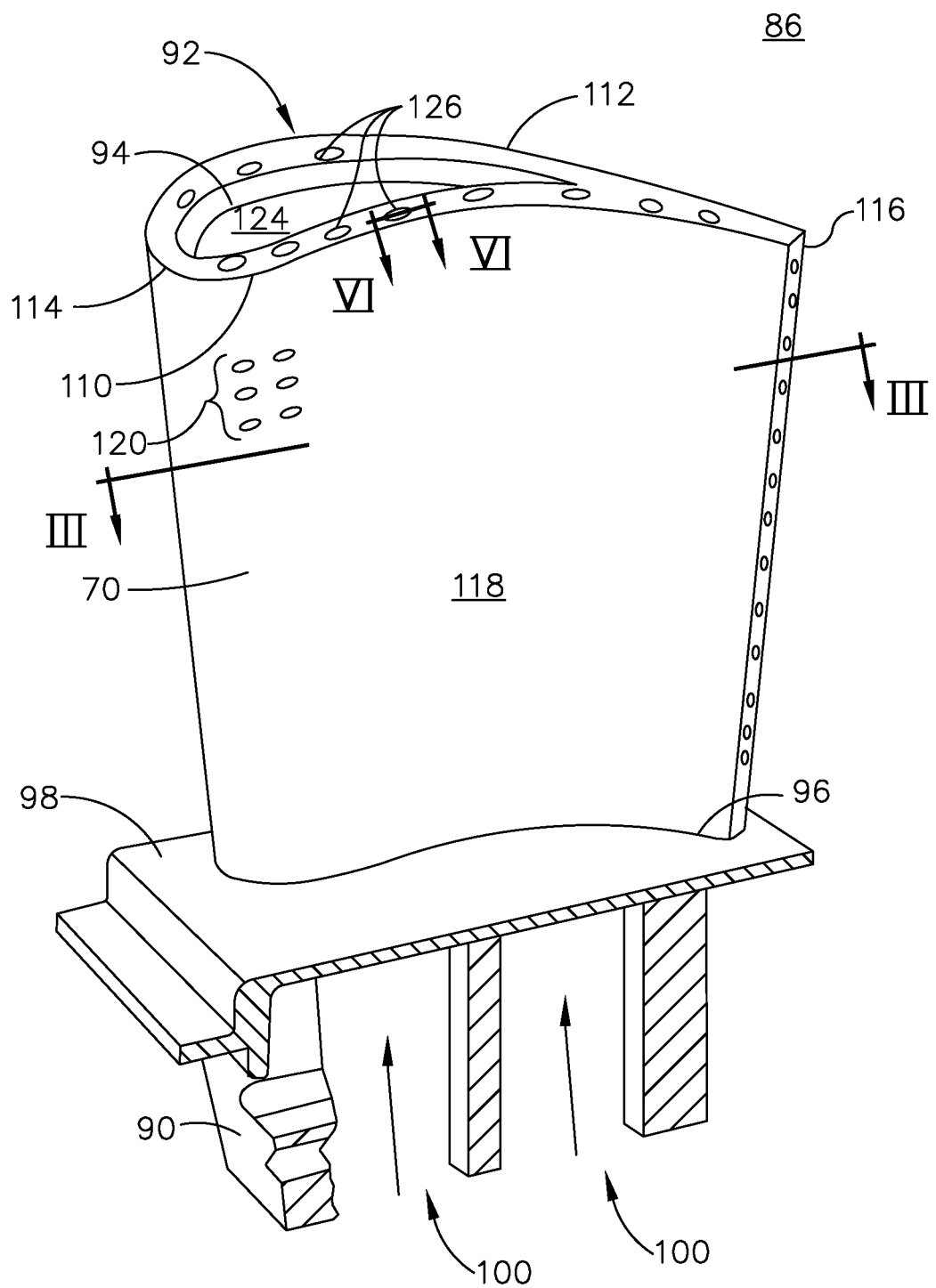
FIG. 2 is a perspective view of a turbine blade including at least one cooling hole.

FIG. 2 is a perspective view of a turbine blade assembly 86 with an engine component in particular a turbine blade 70 of the engine 10 from FIG. 1. Alternatively, the engine component can include a vane, a shroud, or a combustion liner in non-limiting examples, or any other engine component that can require or utilize cooling passages formed from an investment casting process and having a trailing edge or tip portion element.

The turbine blade assembly 86 includes a dovetail 90 and an airfoil 92. The airfoil 92 extends between a tip 94 and a root 96 to define a span-wise direction. The airfoil 92 mounts to the dovetail 90 on a platform 98 at the root 96. The platform 98 helps to radially contain the turbine engine mainstream air flow. The dovetail 90 can be configured to mount to the turbine rotor disk 71 on the engine 10. The dovetail 90 further includes at least one inlet passage 100, exemplarily shown as two inlet passages 100, each extending through the dovetail 90 to provide internal fluid communication with the airfoil 92. It should be appreciated that the dovetail 90 is shown in cross-section, such that the inlet passages 100 are housed within the body of the dovetail 90.

The airfoil 92 includes a concave-shaped pressure side 110 and a convex-shaped suction side 112 which are joined together to define an airfoil shape extending between a leading edge 114 and a trailing edge 116 to define a chord-wise direction. The airfoil 92 bound by an outer wall 118 and defined by the sides 110, 112. A set of film cooling holes 120 can be located along any portion of the outer wall 118 including proximate the leading edge 114 on the pressure side 110. The airfoil 92 can also include a tip wall 122 extending from the tip 94 to define a tip plenum 124. A set of tip cooling holes 126 can be located along the tip wall 122.

Figure 3:
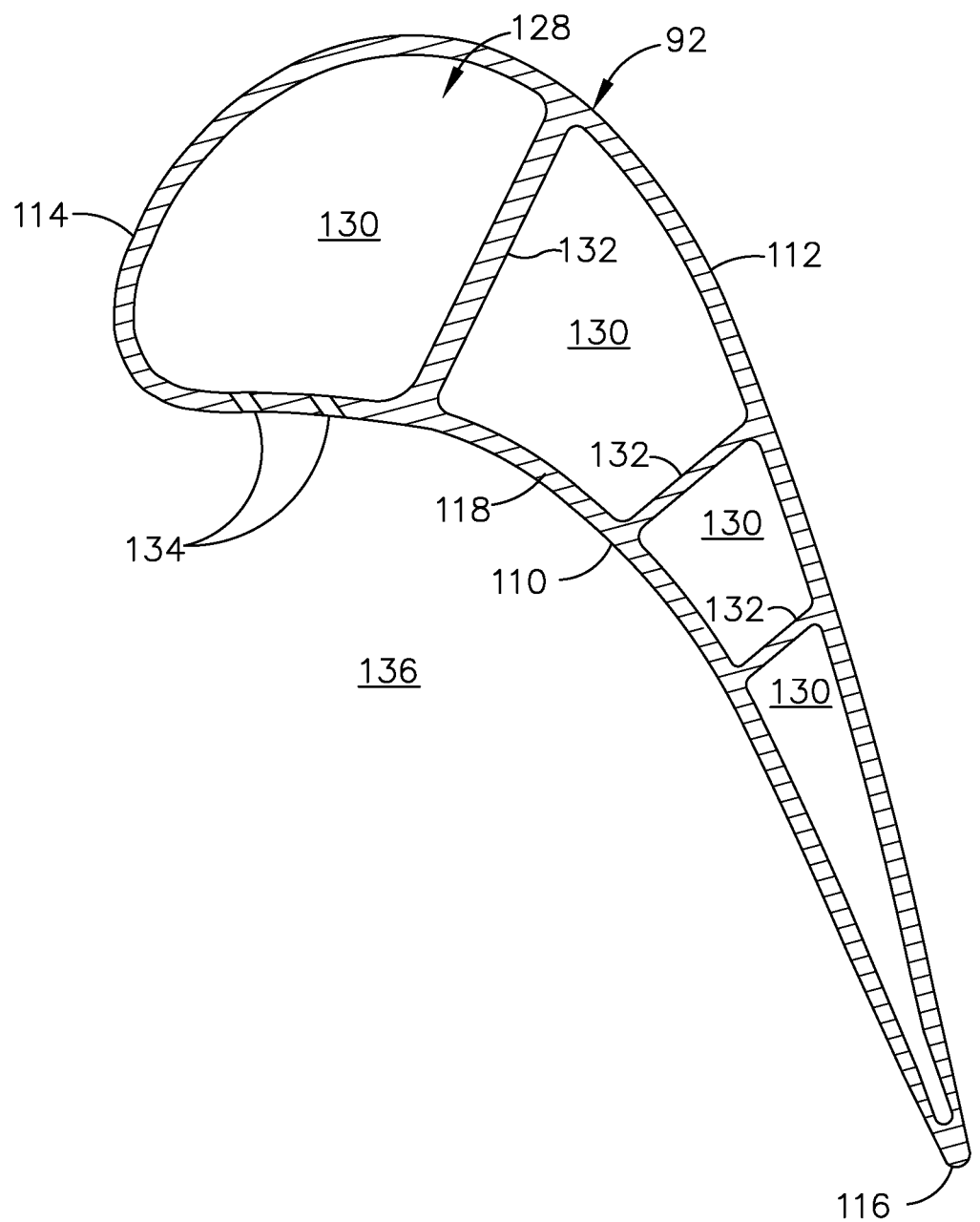
FIG. 3 is a cross-section of the turbine blade from FIG. 2 along line III-III.

Turning to FIG. 3 an interior 128 is bound by outer wall 118 and can include multiple cooling passages 130. The multiple cooling passages 130 can be fluidly coupled with at least one of the inlet passages 100 (FIG. 2). The multiple cooling passages 130 can be separated by interior walls 132. At least one cooling hole 134 can fluidly couple the interior 128 of the airfoil 92 to an exterior 136 of the airfoil 92. It is contemplated that the at least one cooling hole 134 can be part of any set of cooling holes, by way of non-limiting example the set of film cooling holes 120 or the set of tip cooling holes 126 as described herein. The at least one cooling hole 134 can pass through a substrate, which by way of illustration is outer wall 118. It should be understood, however, that the substrate can be any wall within the engine 10 including but not limited to the interior walls 132, the tip wall 122, or a combustion liner wall. Materials used to form the substrate include, but are not limited to, steel, refractory metals such as titanium, or superalloys based on nickel, cobalt, or iron, and ceramic matrix composites. The superalloys can include those in equi-axed, directionally solidified, and crystal structures. The substrate can be formed by, in non-limiting examples, 3D printing, investment casting, or stamping.

The at least one cooling hole 134 is illustrated in more detail in FIG. 4A. The outer wall 118 extends between an exterior, or a heated surface 140, facing a hot gas flow (H), and an interior, or a cooled surface 142, facing a cooling fluid flow (C). It should be understood that the heated surface 140 and the cooled surface 142 are relative to each other and can be any range of temperatures during engine operation.

It is noted that the outer wall 118 as described herein is shown generally planar, however it is understood that the outer wall 118 can be for curved engine components. The curvature of an engine component in such an example can be slight in comparison to the size of the cooling hole 134, and so for purposes of discussion and illustration is shown as planar. Whether the outer wall 118 is planar or curved local to the at least one cooling hole 134, the hot and cooled surfaces 140, 142 can be parallel to each other as shown herein or can lie in non-parallel planes.

A connecting passage 144 extends from an inlet 146 provided on the cooled surface 142 to an outlet 148 provided on the heated surface 140 to define the at least one cooling hole 134. The connecting passage 144 can include a metering section 150 having a circular cross-sectional area (CA1), though any cross-sectional shape is contemplated. A centerline (CL) can pass through a geometric center of the cross-sectional area (CA1) of the metering section 150. It is contemplated that the at least one cooling hole 134 is inclined such that the centerline (CL) is non-orthogonal to the hot and cooled surfaces 140, 142. It is further contemplated that the centerline (CL) is orthogonal to one or both of the hot and cooled surfaces 140, 142. The orientation and geometry of the centerline (CL) is shown for illustrative purposes only and should not be limiting. The metering section 150 can be provided at or near the inlet 146.

A diffusing section 152 can be located downstream of the metering section 150. The diffusing section 152 can be defined by an increasing cross-sectional area (CA2), by way of non-limiting example a conical section. The increasing cross-sectional area (CA2) can increase along the centerline (CL) in the cooling fluid flow (C) direction.

A non-diffusing section 154 can be located downstream of the diffusing section 152. The non-diffusing section can be defined by a constant cross-sectional area (CA3) in the cooling fluid flow (C) direction, by way of non-limiting example a cylindrical section.

Sidewalls 160 define the connecting passage 144. Within the metering section 150, the sidewalls 160*a* can extend generally parallel to each other. Sidewalls 160*b* diverge to form the diffusing section 154. Sidewalls 160*c* converge to again form sidewalls generally parallel to each other for the non-diffusing section.

FIG. 4B is a top-view of the at least one cooling hole 134 looking towards the heated surface 140 along a lateral plane with respect to the outer wall 118. The hot and cooled surfaces 140, 142 have been removed for clarity. For the increasing cross-sectional area (CA2) of the diffusing section 152 the sidewalls 160*b* diverge to form a first side angle $\alpha$ with respect to a normal line parallel to the centerline (CL). The first side angle $\alpha$ can range from 0° to 20°. The sidewalls 160*c* converge where the diffusing section 152 meets the non-diffusing section 154 and extend generally parallel to each other. It is contemplated that a second side angle $\beta$ is less than the first side angle $\alpha$, and can be by way of non-limiting example between 0° and 2°, formed from sidewalls 160*c* with respect to a normal line parallel to the centerline (CL).

The cooling fluid flow (C) flows along the centerline (CL) through the metering section 150 where metering of the mass flow rate of the cooling fluid flow (C) can occur. The cooling fluid flow (C) is then diffused in the diffusing section 152 in serial flow communication with the metering section 150. The cooling fluid flow (C) expands to form a wider and slower diffused airflow (Cd). The diffused airflow (Cd) passes through the non-diffusing section to exit at the outlet 148 forming a cooling fluid film (Cf) along the heated surface H (FIG. 4A).

A method of cooling the engine component as described herein includes flowing the cooling fluid flow (C) through the diffusion section 152 and prior to emitting the cooling fluid flow (C) from the outlet 148 to form the diffused airflow (Cd), flowing the diffused airflow (Cd) through the non-diffusing section 154 to define an extended flow (Ce). The method further includes exhausting the extended flow (Ce) along the exterior, or heated surface 140, of the outer wall 118 to form the cooling fluid film (Cf).

FIG. 5A illustrates a 3D perspective view of the at least one cooling hole 134. It should be understood that the hole is illustrated as a solid but is actually a void in the engine component as discussed herein. The non-diffusing section 154 of the at least one cooling hole 134 can be cylindrical having a circular cross-sectional area 162 as illustrated. It is further contemplated that in engine component substrates where the at least one cooling hole 134 is inclined, an angled outlet 148*a* illustrated in phantom would be produced. It is also contemplated that the at least one cooling hole 134 comprises only a diffusing section 152 and a non-diffusing section such that the inlet 146 is located at the beginning 146b of the diffusing section 152.

FIG. 5B is a cooling hole 234 according to another aspect of the disclosure discussed herein. The cooling hole 234 is substantially similar to the at least one cooling hole 134 of FIG. 5B. Therefore, like parts will be identified with like numerals increased by 100, with it being understood that the description of the like parts of the at least one cooling hole 134 applies to the cooling hole 234 unless otherwise noted.

A non-diffusing section 254 of the cooling hole 234 can have a rounded rectangular cross-sectional area 262 as illustrated. It is further contemplated that sidewalls 216 can diverge along a lateral plane Lp to form side angles β as described herein and furthermore diverge in a direction perpendicular to the lateral plane Lp to define a laidback portion 264. While illustrated as only in one direction, it is contemplated that the laidback portion 264 could be in the other direction or in both directions perpendicular to the lateral plane Lp.

FIG. 5C is a cooling hole 334 according to another aspect of the disclosure discussed herein. The cooling hole 334 is substantially similar to the at least one cooling hole 134 of FIG. 5A. Therefore, like parts will be identified with like numerals increased by 200, with it being understood that the description of the like parts of the at least one cooling hole 134 applies to the cooling hole 334 unless otherwise noted. A non-diffusing section 354 of the cooling hole 334 can have a racetrack shape cross-sectional area 362 as illustrated. While a cylindrical shape, a rounded rectangular shape, and a racetrack shape are contemplated for the non-diffusing section discussed herein, these shapes are for illustrative purposes only and not meant to be limiting. The non-diffusing sections as discussed herein can be extended to other cooling hole shapes such as delayed layback holes, conical holes, or any other cooling hole that has a diffusing section.

Figure 6:
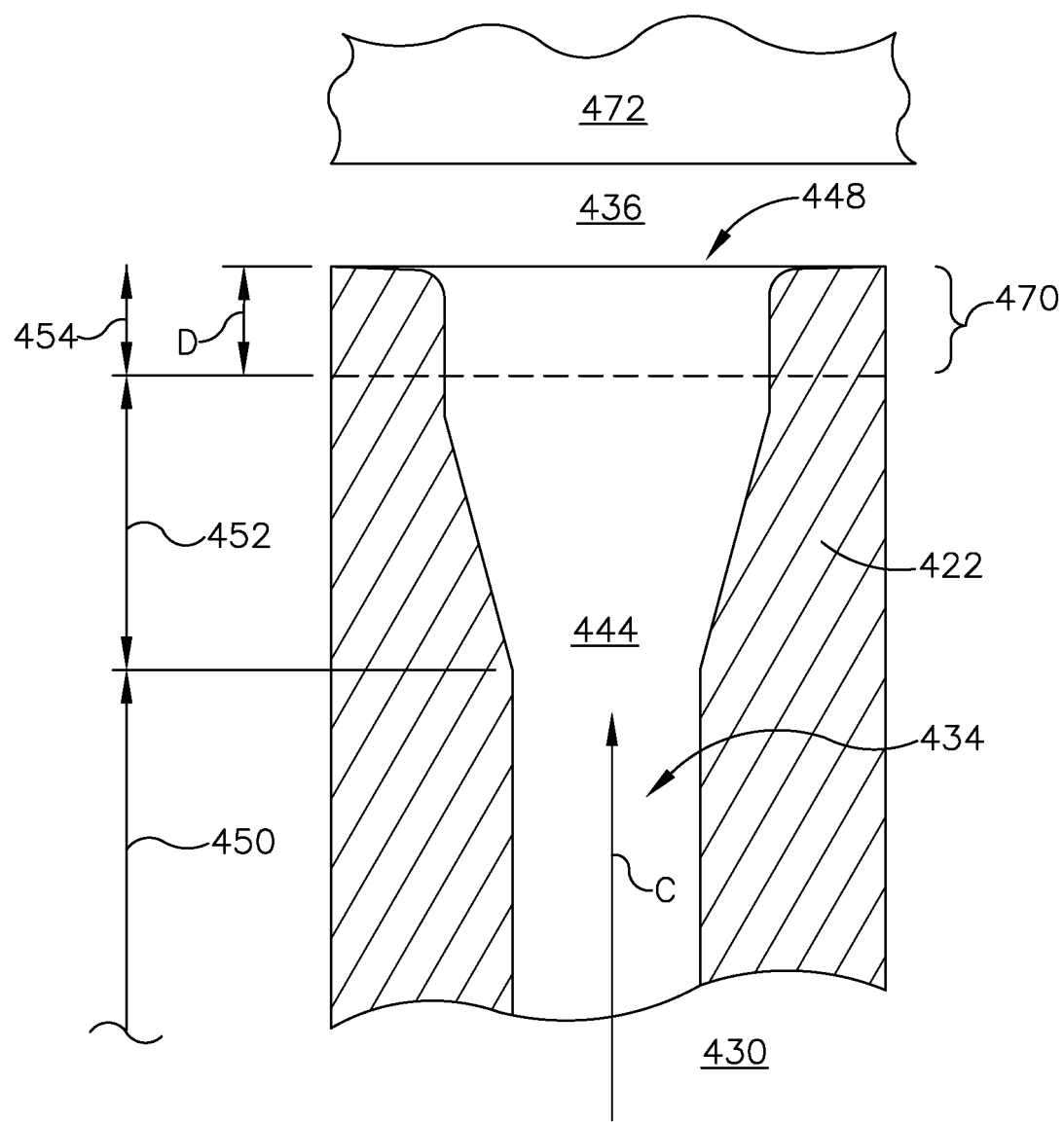
FIG. 6 is a cross-sectional view of the at least one cooling hole from FIG. 2 taken along line VI-VI according to another aspect of the disclosure discussed herein.

Turning to FIG. 6, a cooling hole 434 according to another aspect of the disclosure discussed herein is illustrated. The cooling hole 434 is substantially similar to the at least one cooling hole 334, therefore, like parts will be identified with like numerals increased by 100, with it being understood that the description of the like parts of the at least one cooling hole 334 applies to the cooling hole 434 unless otherwise noted.

Cooling hole 434 can be part of the at least one set of tip cooling holes 126 described herein. The cooling hole 434 can extend through a tip wall 422. A connecting passage 444 can define the cooling hole 434 and fluidly couple a cooling passage 430 to an exterior 436 of the engine component described herein. The connecting passage 444 terminates at an outlet 448 along the tip wall 422. The connecting passage 444 can include a metering section 450, a diffusing section 452, and a non-diffusing section 454 through which a cooling fluid (C) can flow. A rub-section 470 extends to a depth (D) with respect to the tip wall 422 equal to an extent of the non-diffusing section 454.

It is contemplated that during operation the tip wall 422 can come into contact with surrounding segments, by way of non-limiting example a shroud segment 472, causing portions of rub-section 470 of the tip wall 422 to rub away. As these portions are removed, the diffusing section 452 remains intact. The non-diffusing section 454 can therefore ensure continued diffusion within the diffusing section over the lifetime of an engine component.

The shapes for the non-diffusing section as discussed herein provide a smaller footprint along an exterior of the engine component than if the diffusing section as discussed herein had been extended all the way to the outer wall. This enables a tighter compaction of film holes to achieve a better cooling fluid film along the outer wall. Furthermore, shortening the diffusing section can reduce over diffusion in conventionally unstable regions of the blade.

It should be understood that any combination of the geometry related to the orientation of the first and second tip portions with respect to each other and the tip channel is contemplated. The varying aspects of the disclosure discussed herein are for illustrative purposes and not meant to be limiting.

Drilling, investment casting, 3-D printing, or additive manufacturing are exemplary methods of forming the cooling circuits and cooling holes as described herein. It should be understood that other methods of forming the cooling circuits and cooling holes described herein are also contemplated and that the methods disclosed are for exemplary purposes only.

It should be appreciated that application of the disclosed design is not limited to turbine engines with fan and booster sections, but is applicable to turbojets and turbo engines as well.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A component for a turbine engine, which generates a hot gas flow, and provides a cooling fluid flow, comprising:
a wall separating the hot gas flow from the cooling fluid flow and having a heated surface along which the hot gas flows and a cooled surface facing the cooling fluid flow; and
at least one cooling hole comprising a connecting passage extending between an inlet at the cooled surface and an outlet located at the heated surface, with the connecting passage comprising a diffusing section having sidewalls extending linearly, and a non-diffusing section extending between the diffusing section and the outlet to define the outlet on both the upstream and downstream side of the outlet with respect to the hot gas flow at the heated surface and having sidewalls extending linearly and generally parallel to each other from a point where the diffusing section ends to the outlet to define a constant cross-sectional area in the cooling flow direction.

2. The component of claim 1 wherein the diffusing section has an increasing cross-sectional area in the cooling fluid flow direction.

3. The component of claim 2 wherein the increasing cross-sectional area is continuously increasing.

4. The component of claim 1 wherein the cross-sectional area of the non-diffusing section is one of a circular, rounded rectangular, or racetrack shape.

5. The component of claim 1 wherein the non-diffusing section abuts the diffusing section.

6. The component of claim 5 wherein the non-diffusing section abuts the outlet.

7. The component of claim 1 wherein the diffusing section is spaced from the inlet.

8. The component of claim 7 wherein a metering section extends from the inlet to the diffusing section.

9. The component of claim 8 wherein the outlet is an angled outlet with respect to the cooling fluid flow.

10. The component of claim 1 wherein the diffusing section is conical.

11. The component of claim 1 wherein the diffusing section further includes a laidback section.

12. The component of claim 1 wherein the wall is a tip wall and the at least one cooling hole is located along a tip of the component.

13. A method of cooling the component of claim 1 comprising:
 flowing the cooling fluid flow through the diffusing section of the at least one cooling hole and prior to emitting the cooling fluid flow from the outlet to form a diffused airflow;
 flowing the diffused airflow from the diffusing section through the non-diffusing section prior to the outlet to define an extended flow; and
 exhausting the extended flow directly from the non-diffusing section along an exterior of the wall to form a cooling fluid film.

14. The method of claim 13 further including flowing the cooling fluid flow through a metering section.

15. The method of claim 13 further including flowing the cooling fluid flow through the at least one cooling hole within a tip wall of the engine component.

16. A component for a turbine engine, which generates a hot gas flow, and provides a cooling fluid flow, comprising:
 a wall separating the hot gas flow from the cooling fluid flow and having a heated surface along which the hot gas flows and a cooled surface facing the cooling fluid flow; and
 at least one cooling hole comprising a connecting passage extending along a centerline between an inlet at the cooled surface and an outlet located at the heated surface, with the connecting passage comprising a diffusing section, located between the inlet and the outlet and defining sidewalls extending linearly and forming a first side angle with respect to the centerline when viewed from a lateral plane, and a non-diffusing section extending between the diffusing section and the outlet to define the outlet on both the upstream and downstream side of the outlet with respect to the hot gas flow at the heated surface where the sidewalls continue to extend linearly and converge at an end of the diffusing section to form a second side angle less than the first side angle with respect to the centerline when viewed from a lateral plane.

17. The component of claim 16 wherein the first side angle is between 0° and 10° and the second side angle is less than the first side angle.

18. The component of claim 16 wherein the diffusing section has an increasing cross-sectional area in the cooling fluid flow direction.

19. The component of claim 18 wherein the increasing cross-sectional area is continuously increasing.

20. The component of claim 16 wherein the non-diffusing section has a constant cross-sectional area in the cooling fluid flow direction.

21. The component of claim 20 wherein the cross-sectional area of is one of a circular, rounded rectangular, or racetrack shape.

22. The component of claim 16 wherein a metering section extends from the inlet to the diffusing section.

23. The component of claim 16 wherein the outlet is an angled outlet.

24. The component of claim 16 wherein the diffusing section is conical.

25. The component of claim 16 wherein the diffusing section further includes a laidback section.

* * * * *